Figure 1:
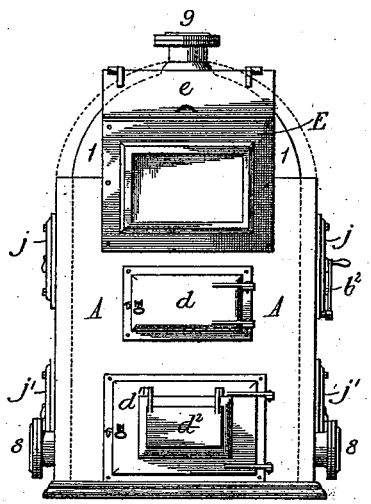

(No Model.)  2 Sheets—Sheet 1.

H. EISERT & R. B. TALCOTT.
HOT WATER HEATER.

No. 526,967.  Patented Oct. 2, 1894.

Witnesses
Will T. Norton
John W. Dudley

Inventors
Hermann Eisert
Robert B. Talcott
By T. L. Brown their Attorney.

(No Model.) 2 Sheets—Sheet 2.

H. EISERT & R. B. TALCOTT.
HOT WATER HEATER.

No. 526,967. Patented Oct. 2, 1894.

Witnesses

Inventors:
Hermann Eisert
Robert B. Talcott
By their Attorney

UNITED STATES PATENT OFFICE.

HERMANN EISERT, OF BALTIMORE, AND ROBERT BARNARD TALCOTT, OF GARRETT PARK, MARYLAND.

HOT-WATER HEATER.

SPECIFICATION forming part of Letters Patent No. 526,967, dated October 2, 1894.

Application filed February 13, 1894. Serial No. 500,035. (No model.)

*To all whom it may concern:*

Be it known that we, HERMANN EISERT, residing at Baltimore, and ROBERT BARNARD TALCOTT, residing at Garrett Park, in the county of Montgomery and State of Maryland, citizens of the United States, have invented certain new and useful Improvements in Hot-Water Heaters; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has reference to new and useful improvements in hot water heaters for use in connection with pipes and radiators for heating the rooms and halls of buildings, and has for its object the production of a simply constructed heater having a large and effective heating surface, and provision for obtaining an immediate and rapid circulation of the water in the entire heating apparatus, with a maximum economy in the consumption of fuel. In heaters of this class heretofore produced, so far as we are aware, the circulation of the water through the heater is attended with difficulties, inasmuch as the passages therefor are made circuitous, and added to this the gases of the highest temperature are directed to heat the water at a point, generally at the bottom of the heater, and the water within the furnace above this point being comparatively cool, considerable time must elapse before the water in the upper part of the heater can be displaced. By reason of this arrangement it will be seen that even after a circulation is established it must necessarily be slow and aside from this, currents of less temperature coming in contact with that of greater temperature within the heater cause a diminution of temperature and a consequent retarding of the circulation. In our construction the gases having the greatest heat are directed to the water at the highest point in the heater or just before the water leaves the heater for circulation through the pipes and radiators, and the body of water below said highest point is heated in proportion to the amount of heat retained by the gases in their passage downward through the heater, after being deflected by impact against the concave under side of the upper or main water containing chamber. The water in the different parts of the heater will absorb heat in proportion to the differential temperature of the gases and the water, and in consequence of the high degree of temperature of the gases at the top of the heater as compared with those at the bottom, the water near the top will absorb heat more rapidly than at or near the bottom. Thus is secured a regular and rapid upward movement of the water in the heater without counter-currents and internal circulation in the heater itself, which would confine the water therein a longer time than necessary without any beneficial results. In practice the water enters the heater in a cool condition at a point at or near its bottom and absorbs the heat while rising, and just before its exit is subjected to the action of the hottest portion of the gases. This insures a circulation immediately after the fire is started and the water having practically a direct passage through the heater, the circulation is a rapid one.

To these ends our invention consists in a heater provided with a water chamber at its top, the bottom of which is so located with relation to the source of heat as to concentrate the products of combustion at their highest temperature, and to then deflect the same downward through the heater and against the connections, thus exhausting their full heating capacity, said chamber having the outlet for the heated water; and provided with a water chamber at its bottom having a water inlet.

The invention also consists in the construction, relative arrangement and operation of the several parts of the heater, all of which will fully and clearly appear from a careful reading of the following description, taken in connection with the accompanying drawings which form a part of this specification, and in which—

Figure 2:
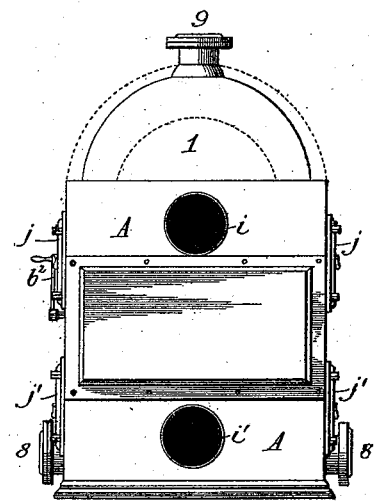
Figure 3:
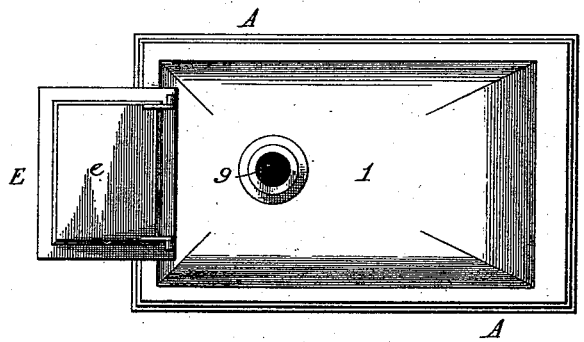
Figures 4, 5, 6:
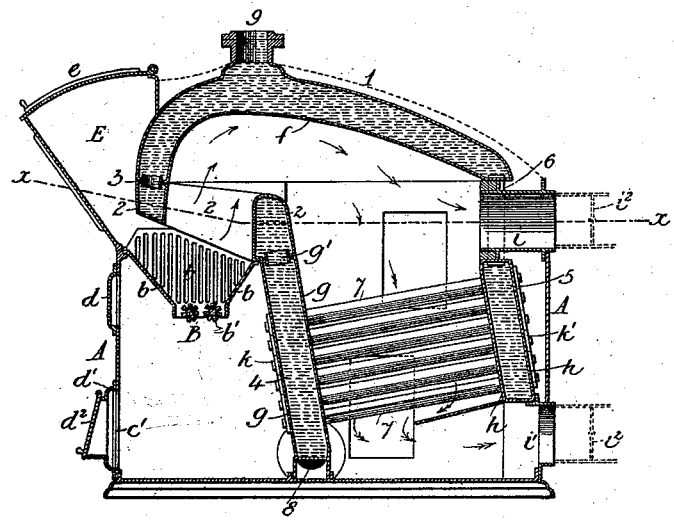

Figure 1 is an elevation of the front of our improved heater. Fig. 2 is an elevation of the rear of the same. Fig. 3 is a top plan view. Fig. 4 is a vertical, central longitudinal sectional view. Fig. 5 is a horizontal sectional view taken on line $x$—$x$ of Fig. 4. Fig. 6 is a detail of the arrangement of tubes.

Like letters and numerals of reference denote like parts in the several figures of the drawings.

In carrying out our invention we construct the heater with an outer casing or shell A, and in the forward end we arrange the fire pot or grate B which is elevated above the place usually adopted, in order to bring the radiated heat and the products of combustion when hottest in contact with the top water section or crown 1. In the rear of the heater we arrange the flues by which the products of combustion pass off to the chimney after they have been deprived of their heat.

The fire pot or grate B is constructed with the sides $b$ of grating, the lower end of which is contracted to form an opening as shown which is closed by two or more revoluble grate bars $b'$ which are operated by a crank handle $b^2$.

Access to the ash chamber or pit C is had by the two openings $c$ and $c'$, the upper one being adjunct to the grate and permitting the agitation of the fuel by the usual tools, and the lower one permitting the removal of the accumulation of ashes. These openings are normally closed by doors $d$, $d'$, the lower one having an auxiliary draft door $d^2$ as shown.

E is a magazine fuel hopper, the lower contracted end of which is open to the fire pot while the inner wall of this hopper is formed by the outer shell of the top water chamber, presently to be described. This hopper is provided with a hinged lid $e$, and in practice is filled with fuel which is gradually fed to the fire pot after the manner of the usual magazine fuel hopper.

The top of the heater consists of a water chamber or reservoir 1, the upper shell of which may form a portion of the casing A and generally be convex, the forward end being curved in the arc of a circle downward and terminating on the water fire box above the point of connection of the hopper and fire pot. This portion of the shell may form the inner wall of the fuel hopper as before stated. The curvature of the shell gradually diminishes and the rearward termination is on a line nearly coincident with the forward end. The lower shell $f$ of the chamber 1 conforms practically to the curvature of the upper shell and is consequently concave. This shell $f$ receives the radiated heat from the burning fuel and is in contact with the products of combustion when at their highest temperature and at the same time serves to deflect the said products in a downward direction, as will presently appear.

Above the fire pot or grate B is a fire box 2 which is also a water chamber, and is immediately under the forward part of the top chamber 1. This fire box as shown in Fig. 5 is rectangular in shape, the rear portion extending across the heater above the back of the grate and having side portions extending from each end thereof forward to the front portion, which latter is located in the front of the heater. This front portion forms a part of the inner wall of the fuel hopper E, and the opening of the lower end of said hopper into the fire box. The two front corners of the fire box come under the corresponding corners of the top water chamber and connection is made at these points by nipples 3, 3. It will be noticed here that the water spaces in this fire box are inclined upward to the front or when connection is made to the top water chamber 1.

4 denotes a water chamber or space, the walls $g$ of which are preferably parallel and extend across the heater transversely at a point just to the rear of the fire pot or grate, and is immediately under the rear part of the fire box. The outer wall of the chamber serves as the rear wall of the ash chamber. The upper end of this chamber is connected by a nipple $g'$ with the rear portion of the fire box 2, (by which communication is established) and terminates at its lower end near the base of the heater, with the inlets for the water, 8—8. The walls $g$ are preferably inclined as shown and for a purpose hereinafter explained.

At the rear of the heater is a water chamber or space 5 formed by walls $h$, and supported in an inclined position preferably between the direct flue $i$ and the indirect flue $i'$. This chamber extends transversely across the heater and connects by means of pipes or tubes 6, 6, with the rear end of the crown or top water chamber 1. The water chambers 4 and 5 have preferably the same degree of inclination and are connected by a series of pipes or tubes 7, 7, which latter complete the communication between the several chambers before described. These tubes are arranged in rows one above the other in such a manner as that the spaces between the pipes of one row are opposite to the pipes in the next adjoining row, in order that the passage through the spaces of the products of combustion may be circuitous, and in that way bring the heated gases in contact with a larger area of the surfaces of the pipes or tubes. In Fig. 6 we have shown a cross sectional view of the tubes, and it will be noted that the distance between the pipes of one row is twice or nearly twice as great as the distance between adjoining pipes of different rows; or in other words the space indicated by $y$—$y$ is about one-half or a little more than one-half the space indicated by $z$—$z$. By this arrangement of the pipes or tubes, the areas of spaces through which the products of combustion pass are practically the same throughout.

The water enters the heater through the inlet openings 8—8 which lead into the lower end of the front water chamber 4. After entering the chamber 4 the water can pass in two directions; through the tubes 7, 7, into the rear water chamber 5 and thence by the pipes or tubes 6, 6, to the top or crown water chamber 1, or through the nipple $g'$ into the water fire box 2 and thence through nipples 3, 3, into the top or crown water chamber 1. From the water chamber 1 the water passes through the outlet 9, which is located at the highest point of said water chamber into the pipes and circulates through the radiator.

The flues $i\ i'$ are each provided with dampers $i^2$ by which the products of combustion may be permitted to escape at different points, in order to increase or decrease the amount of heating surface in contact with the heated gases.

When the damper in the direct flue $i$ is open the products of combustion pass from the fire box along the under-side of the top water section to the upper or direct flue and in this event the heated gases come in contact with the fire box and the top water section only. When the direct damper is closed and damper in flue $i'$ is open the products of combustion are compelled to pass down through the spaces between the tubes 7, 7, and out through the flue $i'$ to the chimney, in this way bringing additional heating surface in contact with the heated gases. The direct flue is intended equally for use when starting fire or when fire has become low.

Access to the interior of the heater for cleaning purposes, &c., is had through openings in the sides of the outer casing, which are normally closed by doors $j\ j'$, and to the interior of the water chambers 4 and 5 and the tubes or pipes through openings normally closed by screw plugs $k\ k'$.

In the operation of the heater, the products of combustion from the fire box are thrown first against the crown sheet or bottom of the top water chamber and are deflected backward and downward between the front and rear water chambers and through the spaces between the tubes. The products of combustion when coming in contact with the crown sheet are at their highest temperature and gradually decrease in temperature in their backward and downward course as heat is given off to the heating surface. When the fire is first started in the heater, the water in the top chamber receives the heat first and a circulation is immediately started in the entire system. An increase in the fire will only cause a more rapid movement of water in the heater and consequently a quicker circulation in the heating apparatus. The return water from the heating apparatus enters the heater at its lowest point receives heat at the lowest rate the gases being of a lower temperature there, and in its upward course receives heat at a gradually increasing rate until the top is reached and the now highly heated water goes out of the top to the radiators of the heating apparatus.

What we claim as our invention, and desire to secure by Letters Patent, is—

1. In a hot water heater, the combination with a fire box, of a shell in the top of the heater constituting a water chamber or space and having an outlet at its highest point, said shell being horizontally rectangular in shape, the under side thereof forming the crown of a combustion chamber and longitudinally concave but diminishing in curvature toward its rearward end and the upper side thereof having a longitudinal curvature similar to that of the under side, the forward end of the shell being located directly over and in close proximity to the fire box.

2. In a hot water heater, the combination of a shell in the top thereof constituting a water chamber or space and having an outlet at its highest point, said shell being longitudinally rectangular in shape, the under side thereof forming the crown of a combustion chamber, and longitudinally and transversely concave but diminishing in longitudinal curvature toward its rearward end and the upper side thereof having a longitudinal curvature similar to that of the under side, a water chamber forming the fire box and located directly under and near to the forward end of the shell and connected to the latter by water ways, and a fire pot beneath said fire box.

3. In a hot water heater, the combination of a shell in the top thereof constituting a water chamber or space and having an outlet at its highest point, said shell being longitudinally rectangular in shape, the under side thereof forming the crown of a combustion chamber, and longitudinally concave but diminishing in curvature toward its rearward end and the upper side thereof having longitudinal curvature similar to that of the under side, a rectangular water chamber forming the fire box and located directly under the forward end of the shell and having communication with the interior thereof, a water chamber in the bottom of the heater having an inlet, and connecting chambers and spaces between said bottom chamber and the shell and fire box water chamber.

4. In a hot water heater, the combination with a water chamber forming a fire box, of a crown water chamber having a concave under side and an outlet for the water at its highest point, a front water chamber and a rear water chamber with connecting water tubes, waterways or connections between the fire box and crown water chamber and front water chamber and between the crown water chamber and rear water chamber said front chamber having a water inlet substantially as described.

5. A hot water heater comprising a top water chamber or space the under side of which forms the crown of a combustion chamber, the fire box located beneath and in close proximity to a portion of said top chamber, a front water chamber below the fire box, a rear water chamber, and a series of sets of water tubes connecting said front and rear chambers, the tubes of one set being opposite to the spaces between the tubes of the adjoining set, and the spaces between the tubes of one set being about or nearly twice as great as the spaces between the tubes of two adjoining sets, substantially as and for the purposes set forth.

In testimony whereof we affix our signatures in presence of two witnesses.

HERMANN EISERT.
ROBERT BARNARD TALCOTT.

Witnesses:
ARMISTEAD PETER, Jr.,
G. FREELANDLITER.